(12) United States Patent
Wang et al.

(10) Patent No.: US 9,882,197 B2
(45) Date of Patent: *Jan. 30, 2018

(54) ALL CLIMATE BATTERY AND MANUFACTURING AND USING THE SAME

(71) Applicant: EC Power LLC, State College, PA (US)

(72) Inventors: Chao-Yang Wang, State College, PA (US); Shanhai Ge, State College, PA (US)

(73) Assignee: EC POWER, LLC, State College, PA (US)

( * ) Notice: Subject to any disclaimer, the term of this patent is extended or adjusted under 35 U.S.C. 154(b) by 834 days.

This patent is subject to a terminal disclaimer.

(21) Appl. No.: 14/255,780

(22) Filed: Apr. 17, 2014

(65) Prior Publication Data

US 2015/0303444 A1    Oct. 22, 2015

Related U.S. Application Data

(60) Provisional application No. 61/890,012, filed on Oct. 11, 2013.

(51) Int. Cl.
*H01M 2/34* (2006.01)
*H01M 10/63* (2014.01)
(Continued)

(52) U.S. Cl.
CPC ............. *H01M 2/348* (2013.01); *H01M 2/30* (2013.01); *H01M 4/66* (2013.01); *H01M 10/0431* (2013.01); *H01M 10/443* (2013.01); *H01M 10/486* (2013.01); *H01M 10/63* (2015.04); *H01M 10/6571* (2015.04); *H01M 10/0525* (2013.01); *H01M 10/30* (2013.01);
(Continued)

(58) Field of Classification Search
None
See application file for complete search history.

(56) References Cited

U.S. PATENT DOCUMENTS 6,072,301 A    6/2000 Ashtiani et al.
6,441,588 B1    8/2002 Yagi et al.
(Continued)

FOREIGN PATENT DOCUMENTS

DE    102012210146 A1    12/2013
JP    9-92335 A    4/1997
(Continued)

OTHER PUBLICATIONS

Entire file history of U.S. Appl. No. 14/267,648.
(Continued)

*Primary Examiner* — Maria Laios
(74) *Attorney, Agent, or Firm* — McDermott Will & Emery LLP

(57) ABSTRACT

A rechargeable battery, module or a pack, having different levels of internal resistance that operate at different temperatures are disclosed. In a subfreezing environment, the battery can exhibit high resistance which once operated or activated, generates heat internally to warm up the battery quickly. Once the batter reaches normal operating temperatures, the battery can switch to a low resistance operating mode, thereby delivering superior power and energy despite operating in a very low ambient temperature.

25 Claims, 13 Drawing Sheets

(51) Int. Cl.
| | |
|---|---|
| H01M 10/6571 | (2014.01) |
| H01M 2/30 | (2006.01) |
| H01M 4/66 | (2006.01) |
| H01M 10/04 | (2006.01) |
| H01M 10/44 | (2006.01) |
| H01M 10/48 | (2006.01) |
| H01M 10/0525 | (2010.01) |
| H01M 10/30 | (2006.01) |

(52) U.S. Cl.
CPC .... *H01M 2220/10* (2013.01); *H01M 2220/20* (2013.01); *Y02E 60/122* (2013.01); *Y02E 60/124* (2013.01)

(56) References Cited

U.S. PATENT DOCUMENTS

| | | | |
|---|---|---|---|
| 8,334,675 | B2 | 12/2012 | Wang et al. |
| 9,502,708 | B2* | 11/2016 | Wang ............ H01M 2/30 |
| 9,627,723 | B2* | 4/2017 | Wang ............ H01M 10/615 |
| 2001/0049050 | A1 | 12/2001 | Aragane et al. |
| 2006/0275653 | A1* | 12/2006 | Chang ............ H01M 2/34 429/62 |
| 2009/0087723 | A1 | 4/2009 | Inda |
| 2010/0173179 | A1 | 7/2010 | Matthias |
| 2012/0032642 | A1 | 2/2012 | Xu et al. |
| 2013/0288089 | A1 | 10/2013 | Kinoshita et al. |

FOREIGN PATENT DOCUMENTS

| | | | |
|---|---|---|---|
| JP | 2002-369402 | A | 12/2002 |
| JP | 2009-118729 | A | 5/2009 |
| JP | 2010-205710 | * | 9/2010 |
| JP | 2010-205710 | A | 9/2010 |
| JP | 2012-69280 | * | 4/2012 |
| JP | 2012-069280 | A | 4/2012 |
| JP | 2012-69280 | A | 4/2014 |
| JP | 2012-69496 | A | 4/2014 |
| WO | 2013/186079 | A1 | 12/2013 |

OTHER PUBLICATIONS

Entire file history of U.S. Appl. No. 15/028,696.
Entire file history of U.S. Appl. No. 15/288,580.
Entire file history of U.S. Appl. No. 14/189,517.
International Search Report and Written Opinion issued in International Patent Application No. PCT/US2014/059729, dated Jun. 29, 2015; 12 pages.
International Search Report and Written Opinion issued in International Patent Application No. PCT/US2014/059726, dated Jun. 26, 2015; 13 pages.
International Search Report issued in International Application No. PCT/US2014/037209 dated Sep. 2, 2014.
Ji, Y. et al., "Heating strategies for Li-ion batteries operated from subzero temperatures", Electrochimica Acta (2013) 107:664-674.
G. Nagasubramanian, "Electrican characteristics of 18650 Li-ion cells at low temperatures," Journal of Applied Electrochemistry, 31 (2001) 99-104, 2001.
S.S. Zhang et al., "Electrochemical impedance study on the low temperature of Li-ion batteries," Electrochimica Acta, 49 (2004) 1057-1061.
H.P. Lin et al., "Low-Temperature Behavior of Li-Ion Cells," Electrochemical Solid-State Letters, 4 (6) A71-A73 (2001).
J. Fan et al., "Studies on Charging Lithium-Ion Cells at Low Temperatures," Journal of the Electrochemical Society, 153 (6) A1081-A1092 (2006).
C.K. Huang et al., "The Limits of Low-Temperature Performance of Li-Ion Cells," Journal of the Electrochemical Society, 147 (8) 2893-2896 (2000).
S.S. Zhang et al., "The low temperature performance of Li-ion batteries," Journal of Power Sources, 115 (2003) 137-140.
M.C. Smart et al., "Electrolytes for Low-Temperature Lithium Batteries Based on Ternary Mixtures of Aliphatic Carbonates," Journal of the Electrochemical Society, 146 (2) 486-492 (1999).
M.C. Smart et al., "Use of Organic Esters as Cosolvents in Electrolytes for Lithium-Ion Batteries with Improved Low Temperature Performance," Journal of the Electrochemical Society, 149 (4) A361-A370 (2002).
S.S. Zhang et al., "Low temperature performance of graphite electrode in Li-ion cells," Electrochimica Acta, 48 (2002) 241-246.
M. D. Zolot et al., "Thermal Evaluation of the Honda Insight Battery Pack," in: 36th Intersociety Energy Conversion Engineering Conference, Savannah, GA, 2001, pp. 923.
A. Pesaran et al., "Cooling and Preheating of Batteries in Hybrid Electric Vehicles," the 6th ASME-JSME Thermal Engineering Joint Conference, Hawaii Island, Hawaii, 2003.
S.S. Zhang et al., "Charge and discharge characteristics of a commerical LiCoO2-based 18650 Li-ion battery," Journal of Power Sources, 160 (2006) 1403-1409.
Y. Ji, et al., "Li-ion cell operation at low temperatures," J. Electrochemical Society, (2013) 160 (4) A636-649.
Non-Final Office Action issued in U.S. Appl. No. 14/267,648 dated Feb. 9, 2016, 19 pages.
Non-final Office Action issued in U.S. Appl. No. 14/189,517 dated Dec. 30, 2015, 38 pgs.
Extended European Search Report issued in Application No. 14877290.8 dated Mar. 17, 2017.

* cited by examiner

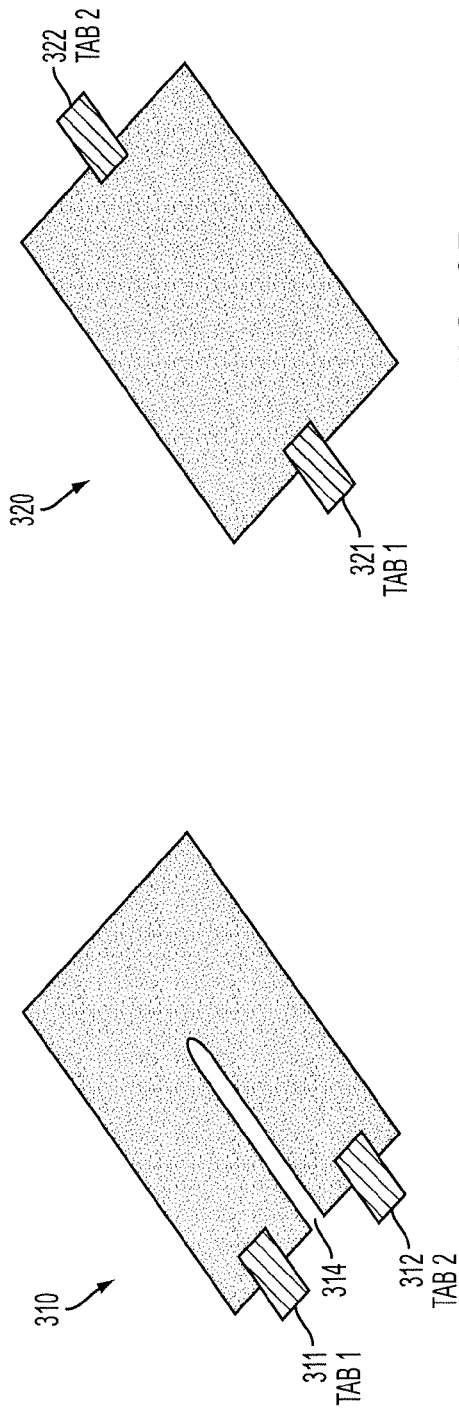
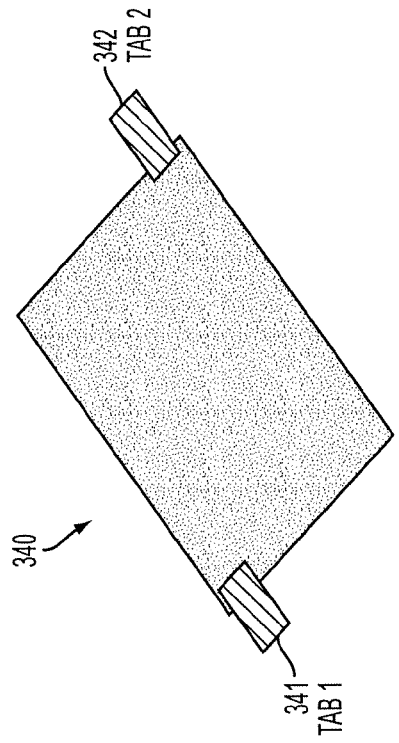
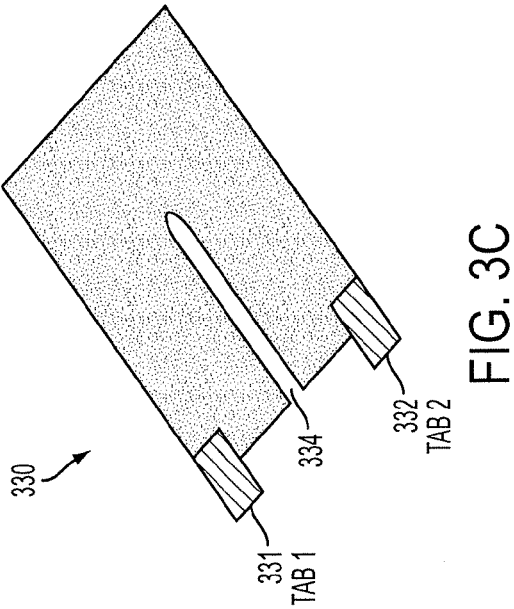

ALL CLIMATE BATTERY AND MANUFACTURING AND USING THE SAME

CROSS-REFERENCE TO RELATED APPLICATION

This application claims the benefit of U.S. Provisional Application No. 61/890,012, filed Oct. 11, 2013, the entire disclosure of which is hereby incorporated by reference herein.

TECHNICAL FIELD

The present invention relates generally to rechargeable batteries, and more particularly, to a rechargeable battery that delivers high power and energy at subfreezing temperatures. Such batteries include lithium-ion batteries for vehicles, grid energy storage and outdoor power backup systems.

BACKGROUND

Rechargeable batteries for electronics, transportation and grid energy storage commonly suffer from low performance and safety concerns at extreme temperatures. At low temperatures, especially subfreezing temperatures, rechargeable batteries, especially lithium-ion batteries, exhibit very low power performance and low energy due to sluggish electrochemical kinetics and transport processes occurring in the battery cell. At high temperatures, lithium-ion batteries become safety hazards. There is a strong need for all climate batteries (ACB) that deliver high performance efficiently and safely at all ambient temperatures.

SUMMARY OF THE DISCLOSURE

An advantage of the present disclosure is a rechargeable battery, such as a lithium ion battery, comprising having one level of internal resistance ($R_1$) over a temperature range of the battery between a first temperature ($T_1$) and a second temperature ($T_2$), and having a second level of internal resistance ($R_2$) outside of either $T_1$ or $T_2$, and a switch that activates $R_2$ when the temperature of the battery is outside of either $T_1$ or $T_2$. Such a rechargeable battery can be operated at one internal resistance level over a temperature range, e.g., the battery can be operated at a low level of internal resistance during normal operation of the battery over normal operating temperatures, and at the other internal resistance level over other temperatures or ranges. For example, the battery can advantageously exhibit an unusually high internal resistance at subfreezing temperatures so that internal heat generated by operating the battery at $R_2$ is sufficiently intensified to cause rapid warm up of the battery and which subsequently enables the battery to output high power and energy despite operating at a low ambient temperature environment.

These and other advantages are satisfied, at least in part, by a rechargeable battery comprising: at least one negative terminal and at least one positive terminal for operating the battery at one level of internal resistance ($R_1$) over a temperature range of the battery between a first temperature ($T_1$) and a second temperature ($T_2$); at least one high resistance terminal for operating the battery at a second level of internal resistance ($R_2$) outside of either $T_1$ or $T_2$; and a switch that activates $R_2$ when the temperature of the battery is outside of either $T_1$ or $T_2$.

In certain aspects of the present disclosure, a rechargeable battery includes wherein the at least one high resistance terminal is electrically connected to at least one resistor sheet within a cell of the battery or between cells of the battery or wherein the at least one high resistance terminal is electrically connected to at least one resistor sheet within a cell of the battery and wherein the at least one resistor sheet is integrally part of the current collector of an electrode of the cell of the battery. For example, the rechargeable battery can include one or more resistor sheets embedded within stacks or jelly-rolls of electrode-separator sheets of a conventional battery and three terminals for operating the battery. The terminals allow operation of the battery at a low-resistance level $R_1$ or at a high-resistance level $R_2$. The three terminals can include either of one positive and two negative terminals or two positive terminals and one negative terminal. The former configuration is preferred. The two same-polarity terminals can further be connected by a switch that is self-activated thermally or driven by a temperature controller such that the battery switches between the terminals for operating the battery at $R_1$ and the terminals for operating the battery at $R_2$, depending on the battery temperature.

Embodiments of the present disclosure include wherein the at least one resistor sheet is configured to have two tabs, with one tab electrically connected to other electrode tabs in the battery to form a low-resistance terminal, and the other tab of the at least one resistor sheet forming the at least one high-resistance terminal or wherein the at least one resistor sheet is the same as either or both of the two metal current collectors used in a battery cell, or a portion of the two metal current collectors.

Additional embodiments of the disclosure include a rechargeable battery including one or more resistor sheets or foils outside and between battery cells in a module such that the resistor sheets do not contact directly with the battery electrolyte and battery cells do not need modification. The resistor sheets are connected in series with battery cells with a thermally activated switch in between. Such a construction can act to change the resistance levels of the battery module as a function of temperature.

Another aspect of the present disclosure is a method of operating a rechargeable battery. The method comprising operating a battery comprising one level of internal resistance ($R_1$) at a temperature range of the battery between a first temperature ($T_1$) and a second temperature ($T_2$), and operating the battery at a second level of internal resistance ($R_2$) outside of either $T_1$ or $T_2$ by activating a switch that activates $R_2$ when the temperature of the battery is outside of either $T_1$ or $T_2$.

Another aspect of the present disclosure is a method of activating a rechargeable battery from a very low ambient temperature, e.g. −40° C., for high power and energy output. In such cold environments, the battery is initially at the high resistance level, and the activation process comprises of discharging the battery by a constant-voltage, constant-current (CVCC) cycle where the constant voltage is set, for example, between 0.2 and 1V and the current limit is set in a range from 1 C to 10 C. Then the constant current at the limit ensues. This activation process results in generation of significant internal heat within the battery, raising the battery temperature much higher in a very short period of time, e.g. 30 seconds. At the higher battery temperature, the all climate battery automatically switches to the low resistance mode, able to output high power and energy comparable to that at room temperature.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein:

FIG. 3 shows four designs of resistor sheet/foil with two tabs. One tab is electrically connected or welded to all tabs of negative electrode sheets to form LoR(−) terminal, and the other connected to the HiR(−) terminal. 3A: two tabs located on the same side of the sheet separated by a small cut in the middle to control the resistance path between the two tabs. 3B: two tabs are located on the opposite side. 3C: two tabs are located on the same side toward the outer edges. 3D: two tabs on the opposite side toward the outer edges.

FIG. 11A compares 1 C discharge curve of the ACB with the conventional Li-ion battery (LiB) at −30° C. FIG. 11B compares the battery temperature evolutions with time between the ACB and conventional LiB.

FIG. 13A shows the current Profile of a hybrid power pulse characterization (HPPC) test; FIG. 13B shows voltage response of 26 Ah of the ACB in a HPPC test; and FIG. 13C shows discharge and charge power of 26 Ah ACB at −30° C.

DETAILED DESCRIPTION OF THE DISCLOSURE

Figure 1:
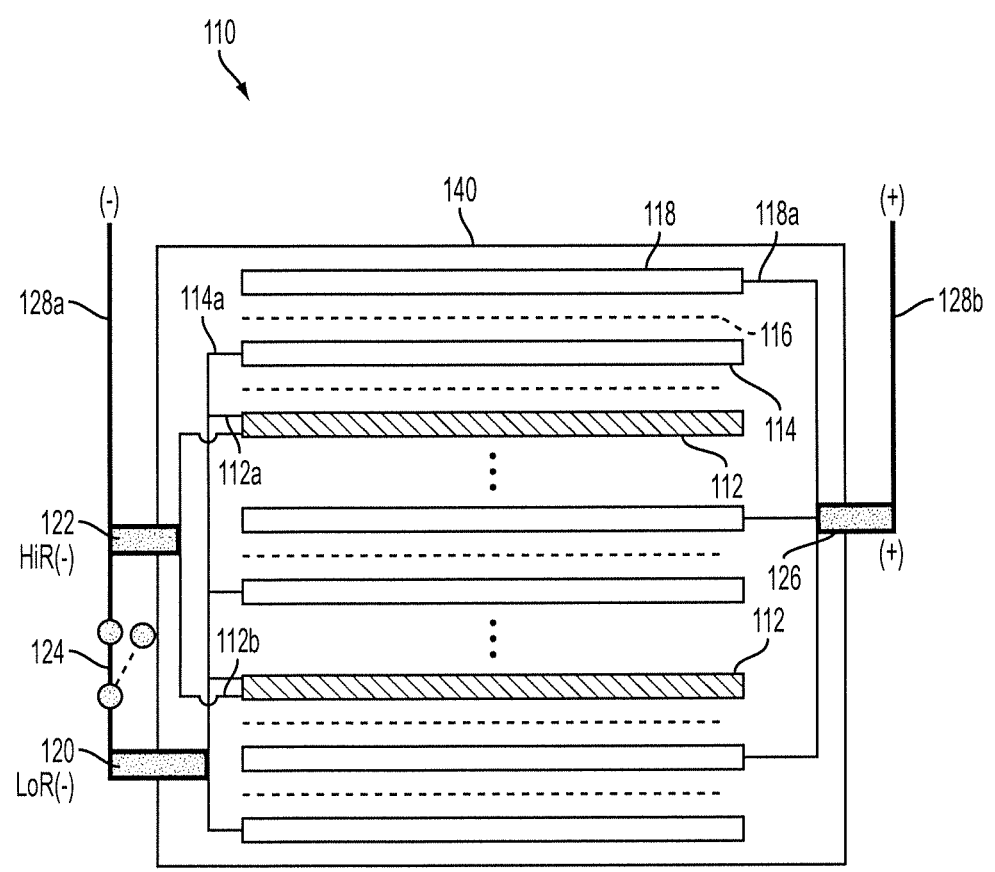
FIG. 1 is a schematic showing construction of an all climate battery (ACB) having several resistor sheets/foils embedded within a stack of electrode-separator assemblies, one high-resistance negative terminal HiR(−) and one low-resistance negative terminal LoR(−), one positive terminal (+), and a thermally activated switch connecting the HiR(−) and LoR(−) terminals, according to an embodiment of the present disclosure.

The present disclosure relates to a rechargeable battery that can deliver improved power and energy at subfreezing temperatures compared to conventional rechargeable batteries. Such batteries are referred to herein as an All Climate Battery (ACB). As used herein the term battery is used to represent any rechargeable electrochemical energy storage device that contains one or more electrochemical cells. The basic elements of a battery cell include an anode electrode coated on a current collector, a separator, a cathode electrode coated on another current collector and an electrolyte.

In one aspect of the present disclosure, the rechargeable battery can amplify internal heating within battery cells at low ambient temperatures so that the electrochemical and transport processes controlling the battery performance can be greatly improved. The internal heating of the battery can be addressed, in part, by configuring a battery with one or more resistor sheets to heat one or more of the cells of the battery and a switch to enable the battery to operate at a high resistance or a low resistance depending on the battery temperature.

The battery configuration of the present disclosure can be applied to a variety of batteries such as, but not limited to, lithium-ion, lithium-polymer, lead-acid, nickel-metal hydride, nickel-manganese-cobalt, lithium-sulfur, lithium-air and all solid-state batteries. The rechargeable battery can be in the form of, for example, a pouch, cylindrical, prismatic or an angular form. Such batteries are useful for transportation, aerospace, military, and stationary energy storage applications.

An advantage of the All Climate Battery of the present disclosure is that the internal resistance of the battery becomes very high at temperatures below normal operating temperatures, e.g., less than 5° C. or at subfreezing temperatures (temperatures less than about 0° C., e.g., less than about −10° C., −20° C., −30° C., or −40° C.). The high internal resistance of the battery creates heat within the battery which can be used to warm the battery. Preferably the internal resistance of the battery becomes high enough to rapidly warm the battery by tens of degree Celsius within seconds or within up to a few minutes. After the battery temperature reaches a range between 0° C. and the normal operating temperature of the battery, typically at about 5° C. or higher, the high internal resistance is deactivated allowing the ACB to operate at a low internal resistance mode, as low as in conventional batteries, thereby enabling the battery to deliver high power and energy despite being in a very low ambient temperature environment.

In an aspect of the present disclosure, a rechargeable battery includes one level of internal resistance ($R_1$) over a temperature range of the battery between a first temperature ($T_1$) and a second temperature ($T_2$), and a second level of internal resistance ($R_2$) outside of either $T_1$ or $T_2$. In an embodiment of the present disclosure $T_1$ is less than about 5° C., e.g., preferably less than about 0° C., −10° C., −20° C., −30° C., or −40° C.; and $T_2$ is a temperature greater than about the normal or an optimum operating temperature of a given rechargeable battery, e.g., greater than about 50° C.

An example of such a battery includes a rechargeable battery comprising at least one negative terminal and at least one positive terminal for operating the battery at $R_1$, e.g. at a low internal resistance level (LoR), between $T_1$ and $T_2$ and at least one high resistance terminal for operating the battery at $R_2$, e.g. at a high internal resistance level (HiR), when the battery temperature is outside of either $T_1$ or $T_2$. The high resistance terminal can either be an additional negative terminal (i.e., a HiR (−)) or an additional positive terminal (i.e., a HiR(+)).

Such a rechargeable battery can include a switch that switches the resistance levels of the battery. For example the switch can engage the low resistance terminals of the battery, e.g., LoR (−) and/or LoR (+), to operate the battery when the temperature of the battery is between $T_1$ and $T_2$, and can engage one or more high resistance terminal, e.g., HiR(−) and/or HiR(+), when the battery temperature is outside of either $T_1$ or $T_2$.

The switch of the present disclosure can include those activated by thermally sensitive devices such as a glycol-water liquid capsule that expands upon freezing and pushes the switch open, a phase-change material that undergoes phase transition and appreciable volume change at $T_1$ or $T_2$ or both, or a bimetal switch, or a solid material whose volume expands appreciably at temperature $T_1$ or $T_2$ or both, for example.

The switch of the present disclosure can be composed of an electromechanical relay and a temperature controller, or a solid-state relay with a temperature sensor, a power MOSFET with a temperature sensor, or a high-current switch with a temperature sensor. Alternatively, the switch connecting LoR(−) and HiR(−) terminals can be carried out by a controller having an electric circuit and a cell temperature sensor in a battery management system.

In an embodiment of the present disclosure, the rechargeable battery includes at least one resistor sheet that is electrically connected to the high resistance terminal. The at least one resistor sheet can be located either inside a battery cell (exposed to the electrolyte), or outside and between two battery cells, or a combination of some resistor sheets inside cells and some resistor sheets outside cells. In addition, the resistor sheet configured within a cell of the battery can be integrally part of the current collector of an electrode of the cell of the battery.

As used herein, a resistor sheet is a material that has a similar or lower electrical conductivity relative to an unmodified current-collecting foil of a battery's electrode but causes a significant increase in the internal electrical resistance of the battery when activated during battery operation. The resistor sheet preferably has a resistance in units of Ohm equal to the numerical value of between 0.1 to 5 divided by the battery's capacity in Amp-hours (Ah), e.g. between about 0.5 to 2 divided by the battery's capacity in Ah. For example the resistor sheet for a 20 Ah battery is preferably between about 0.005 Ohm (0.1 divided by 20) to about 0.25 Ohm (5 divided by 20), e.g. between about 0.025 Ohm (0.5 divided by 20) to about 0.1 Ohm (2 divided by 20).

The resistor sheets of the present disclosure can be any sufficiently conductive material that is stable when exposed to battery electrolytes and within the electrochemical voltage window of an All Climate Battery when the resistor sheet is exposed to such an environment. Such resistor sheets can be made of, for example, graphite, highly ordered pyrolytic graphite (HOPG), stainless steel, nickel, chrome, nichrome, copper, aluminum, titanium, or combinations thereof. If used outside of battery cells and between two adjacent cells in a module, the resistor sheets do not need to be anti-corrosive and thus additional materials are available for use as resistor sheets of the present disclosure. In certain embodiments, the resistor sheet of the present disclosure is preferably flat with a large surface area so that it can have good contact with adjacent battery components. The resistor sheets of the present disclosure can have a thickness between about 1 micrometer and about 150 micrometers with a preferred range of about 5 to about 60 micrometers. Resistor sheets that have large electrical resistance, high thermal conductivity, and small heat capacity are useful for certain embodiments of the present disclosure.

In certain configurations of the present disclosure, the rechargeable battery includes one or more high resistance tabs or terminals and one or more low resistance tabs or terminals. The high resistance terminals electrically connect the one or more resistance sheets and the low resistance tabs or terminals are configured to operate the battery in a low internal resistance mode.

Advantageously, the rechargeable battery of the present disclosure can be readily configured with conventional rechargeable battery components with minimal modification in certain embodiments. In general terms, a conventional battery, such as a lithium-ion battery, includes sheets of one or more of anode electrodes, separators and cathode electrodes that can be either stacked up or wound in a jelly roll and packaged in a pouch cover or hard case. Then the pouch or case is filled with an electrolyte. The cathode active materials can include, for example, lithium cobalt oxide, lithium iron phosphate, lithium manganese oxide, lithium nickel-cobalt-manganese oxides, lithium-rich layered oxides, or their mixtures, etc. Anode active materials can include, for example, graphite, silicon, silicon alloys, lithium metal, lithium alloys such as lithium titanate, their mixtures, etc.

For example, a conventional lithium-ion battery includes a positive electrode, a negative electrode, a separator, a positive electrode current collector, a negative electrode current collector, an electrolyte and a battery cover or can. The positive electrode coated on one current collecting foil (e.g. Al foil) and the negative electrode coated on another current collecting foil (e.g. Cu foil) are stacked or wound with a separator interposed in-between, and an electrolyte solution in which an electrolyte is dissolved in a solvent is impregnated in the separator and the two porous electrodes.

Both positive and negative electrodes include afore-described active materials, binders and conducting agents if necessary. Common binders include PVDF (Polyvinylidene fluoride) and styrene-butadiene rubber (SBR) and sodium salt of carboxymethyl cellulose (CMC). Conducting agents are usually carbon-based and mixed with the active materials to increase the electrode conductivity.

Lithium salts such as $LiPF_6$, $LiBF_4$, etc. can be used singly or in combination as the electrolyte. Chained carbonate, annular carbonate, annular ester, nitrile compounds and the like can be used as the solvent used to dissolve the lithium salts. Specific examples thereof include ethylene carbonate (EC), ethyl methyl carbonate (EMC), dimethyl carbonate (DMC), propylene carbonate (PC), diethyl carbonate, dimethoxyethane, etc. In addition, a polymer-gel electrolyte or a solid electrolyte can be used as the electrolyte.

A rechargeable battery of the present disclosure can include the conventional components of a rechargeable battery and additionally include one or more high resistance terminals connected to one or more resistor sheets, for example. The one or more resistor sheets can be positioned within a cell of the battery or between cells of a battery or some combination thereof to generate heat within the battery. The following figures illustrate certain embodiments of the present disclosure.

Figure 2:
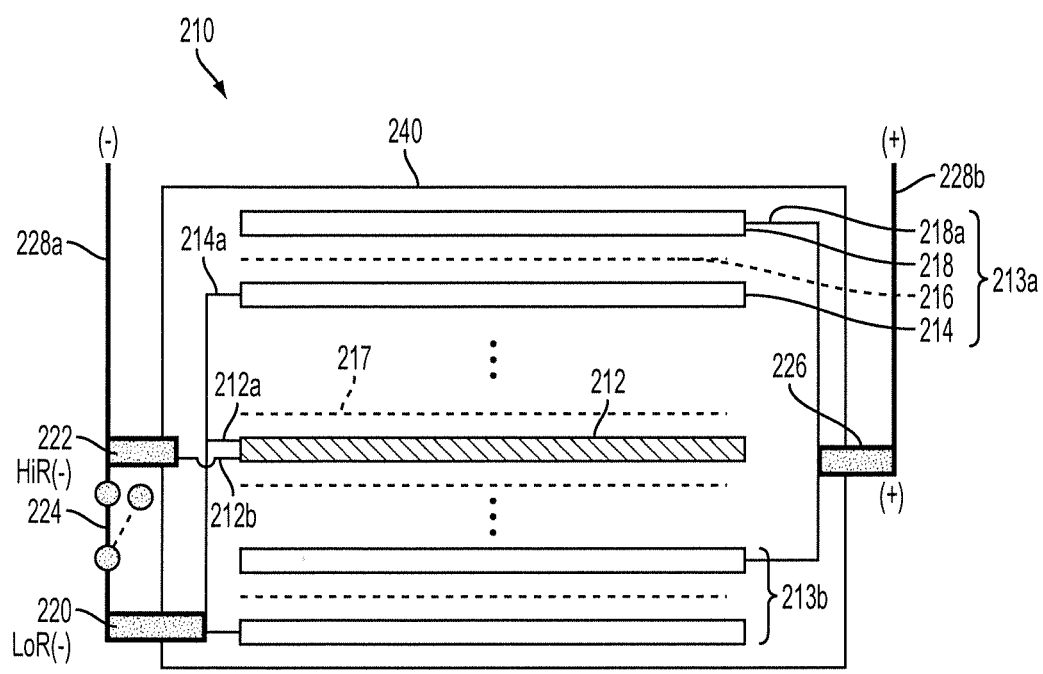
FIG. 2 illustrates a construction of all climate battery composed of one resistor sheet/foil embedded in the middle of a stack of electrode-separator assembly according to the embodiment of the present disclosure.

FIGS. 1 and 2 illustrate embodiments of the present disclosure. As shown in FIG. 1, rechargeable battery 110 has several resistor sheets 112 embedded within a stack of electrode-separator assemblies. The electrode-separator assemblies include anode electrodes 114 having anode tabs 114a, separators 116 and cathode electrodes 118 having cathode tabs 118a. Battery 110 further includes one low-resistance negative terminal LoR(−) 120 and one high-resistance negative terminal HiR(−) 122, switch 124 and positive terminal (+) 126.

In this embodiment, each resistor sheet has two tabs (112a, 112b), which can be attached by welding. Resistor tab 112a and anode tabs 114a of anode electrodes 114 are electrically connected to low-resistance negative terminal LoR(−) 120 to form a low electrical resistance circuit. Resistor tab 112b is electrically connected to high-resistance negative terminal HiR(−) 122 to form a high electrical resistance level circuit that is activated by switch 124. Cathode tabs 118a of cathode electrodes 118 are electrically connected together and to positive terminal 126. In this particular example, switch 124 is a thermally activated switch that can electrically connect or disconnect LoR(−) terminal 120 and HiR(−) terminal 122.

The anode-separator-cathode-resistor sheet assembly can be place in an appropriate package, e.g., in a casing of a pouch cell and filled with electrolyte. In this embodiment, the anode-separator-cathode-resistor sheet assembly is contained in casing 140. The negative and positive terminals can be electrically connected to an external circuit 128a and 128b.

In sum, the rechargeable battery illustrated in FIG. 1 features three terminals on the outside of casing 140, two negative terminals, LoR(−) and HiR(−), and one positive terminal (+). The two negative terminals, LoR(−) and HiR(−), are further connected by a temperature-sensitive switch immediately outside of the battery. In operation, when the battery temperature is within in a normal operating range, defined as between a first temperature $T_1$ and a second temperature $T_2$, the switch is CLOSED and the battery current bypasses the resistor sheets since current prefers to flow through the low-resistance circuit. In this case, the battery operates between the terminals (+) and LoR(−), exhibiting a low internal resistance. When the battery temperature goes outside the normal range of $T_1$ and $T_2$, the switch is made OPEN, leaving the terminals (+) and HiR(−) operative. This forces the battery current to flow through the resistor sheets and hence exhibits high internal resistance. For example, when the battery temperature is below a normal range, such as below about 5° C. or in subfreezing environments, the internal resistance of the battery becomes several-fold higher due to the presence of the resistor sheets in the current flow path. Once operated or activated, there is intense internal heating (as the battery's heat generation is proportional to its internal resistance), which leads to rapid rise of the battery temperature to a point that triggers the temperature-sensitive switch to CLOSED. The CLOSED switch immediately enables the LoR(−) terminal to be operative and lowers battery internal resistance. The combination of low internal resistance and high internal temperature substantially improves power and energy output of the battery despite operating in subfreezing environments.

FIG. 2 shows another configuration of a rechargeable battery having at least one resistor sheets inserted between a stack of the electrode-separator assemblies for generating heat in the battery. In this embodiment, rechargeable battery 210 includes resistor sheet 212 positioned between two electrode-separator assemblies 213a and 213b. The resistor sheet is preferably positioned in the middle of the stack of electrodes for more even heating and can be sandwiched by separators 217 that can be the same or different than separators 216. Each electrode-separator assembly includes anode electrodes 214, separators 216 and cathode electrodes 218. Battery 210 further includes one low-resistance negative terminal LoR(−) 220, one high-resistance negative terminal HiR(−) 222, switch 224 and positive terminal (+) 226.

In this embodiment, resistor sheet 212 has two tabs (212a, 212b), which can be attached by welding. Resistor tab 212a and anode tabs 214a of anode electrodes 214 are electrically connected to low-resistance negative terminal LoR(−) 220 to form a low electrical resistance circuit. Resistor tab 212b is electrically connected to high-resistance negative terminal HiR(−) 222 to form a high electrical resistance level circuit that is activated by switch 224. Cathode tabs 218a of cathode electrodes 218 are electrically connected together and to positive terminal 226. In this particular example, switch 224 is a thermally activated switch that can electrically connect or disconnect LoR(−) terminal 220 and HiR(−) terminal 222.

The anode-separator-cathode-resistor sheet assembly can be placed in an appropriate package, e.g., in a casing of a pouch cell and filled with electrolyte. In this embodiment, the anode-separator-cathode-resistor sheet assembly is contained in casing 240. The negative and positive terminals can be electrically connected to an external circuit 228a and 228b. The rechargeable battery 210 of FIG. 2 can be operated in the same manner as described for FIG. 1.

FIG. 3 illustrates different resistor sheet configurations that can be used in the rechargeable batteries of the present disclosure, including in the configurations shown in FIGS. 1 and 2. Each resistor sheet, 310, 320, 330, 340, has two tabs, which can be attached by welding. The tabs on the various resistor sheets can be positioned in various configurations, as shown in FIG. 3. These configurations include: (a) 2 tabs on the same side (311, 312), separated by cut 314; (b) 2 tabs on the opposite side of the resistor sheet and located at approximately in the middle of the edge (321, 322); (c) 2 tabs on the same side, but on the outer edges of the resistor sheet (331, 332) and separated by cut 334; and (d) 2 tabs on the opposite side of the resistor sheet but on outer edges (341, 342). In one embodiment of the present disclosure, one or more of the resistor sheets shown in FIG. 3 can be used in the configurations of FIG. 1 or 2. For example, for any resistor sheet in FIG. 3, the tabs labeled as Tab 1 can be connected (e.g. welded) with all tabs of the anode electrode sheets in the battery. Together, they form the low-resistance terminal LoR(−) in FIG. 1 or FIG. 2. Tabs 2 as shown in FIG.

3 can be welded together to form the high-resistance terminal HiR(−) in either FIG. 1 or FIG. 2.

Figure 4:
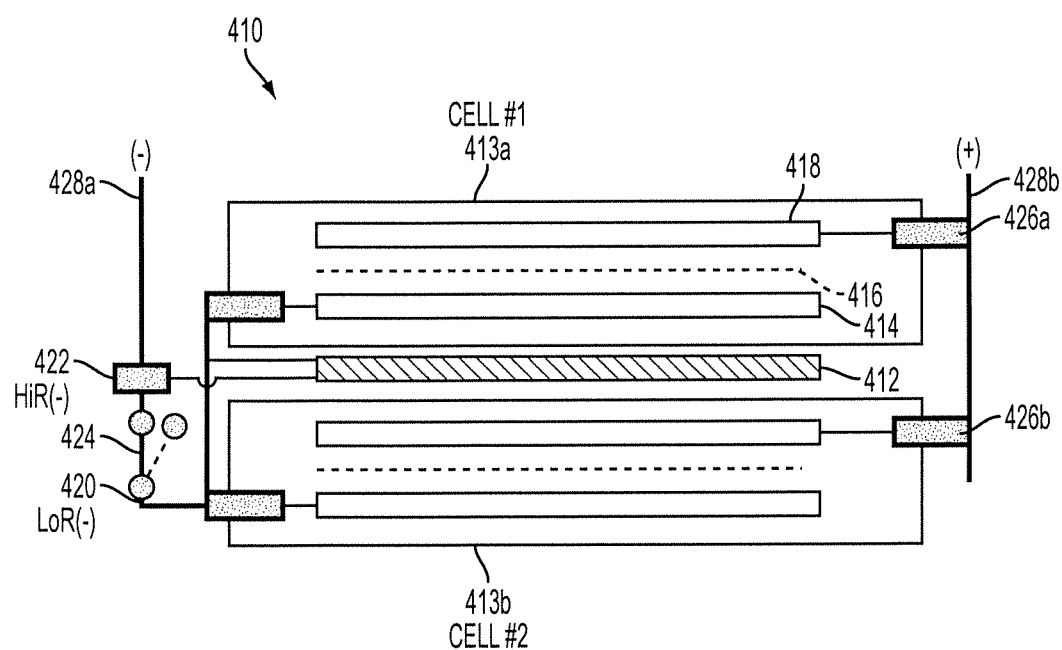
FIG. 4 shows construction of a twin-cell battery module with one resistor sheet/foil between the two cells, i.e. outside each cell casing without direct contact with battery electrolyte according to the embodiment of the present disclosure.

In other embodiments of the present disclosure, a rechargeable battery can be configured by placing one or more resistor sheets outside a cell of the battery. For example, with a battery module including multiple cells the one or more resistor sheets can be sandwiched between two adjacent cells within the battery module. FIG. 4 illustrates such an embodiment.

As shown in FIG. 4, battery module 410 includes resistor sheet 412 positioned between two cells 413a and 413b. The resistor sheet is preferably positioned between the cells to provide even heating of the cells and battery module, such as interposed tightly between the two cells. Each cell includes anode electrodes 414, separators 416 and cathode electrodes 418. Battery module 410 further includes one low-resistance negative terminal LoR(−) 420 which is electrically connected to each cell of the module and one high-resistance negative terminal HiR(−) 422, which is electrically connected to the resistor sheet. The battery module also includes switch 424 and positive terminals (+) 426a and 426b. The negative and positive terminals can be electrically connected to an external circuit 428a and 428b. The rechargeable battery module 410 of FIG. 4 can be operated in the same manner as described for FIG. 1.

While battery module 410 in FIG. 4 is illustrated as a twin-cell module with one resistor sheet between the two cells, battery modules of the present disclosure can have more than two cells and/or more than one resistor sheets positioned in the middle of the cell modules. For example, the battery module can have 4, 5 or 6 cells with one or more resistor sheets positioned between cells and around other positions near the cells.

In one embodiment of the present disclosure, one or more of the resistor sheets shown in FIG. 3 can be used in the configurations of FIG. 4. For example, for any resistor sheet in FIG. 3, the tabs labeled as Tab 1 can be connected to the negative terminals of the cells, forming a low-resistance terminal for the battery module, LoR(−). Tab 2 of any of the resistor sheets shown in FIG. 3 can be welded together to form the high resistance terminal of the battery module, HiR(−). The activation and operation of such a battery module is the same as for a single cell described earlier.

Figure 5:
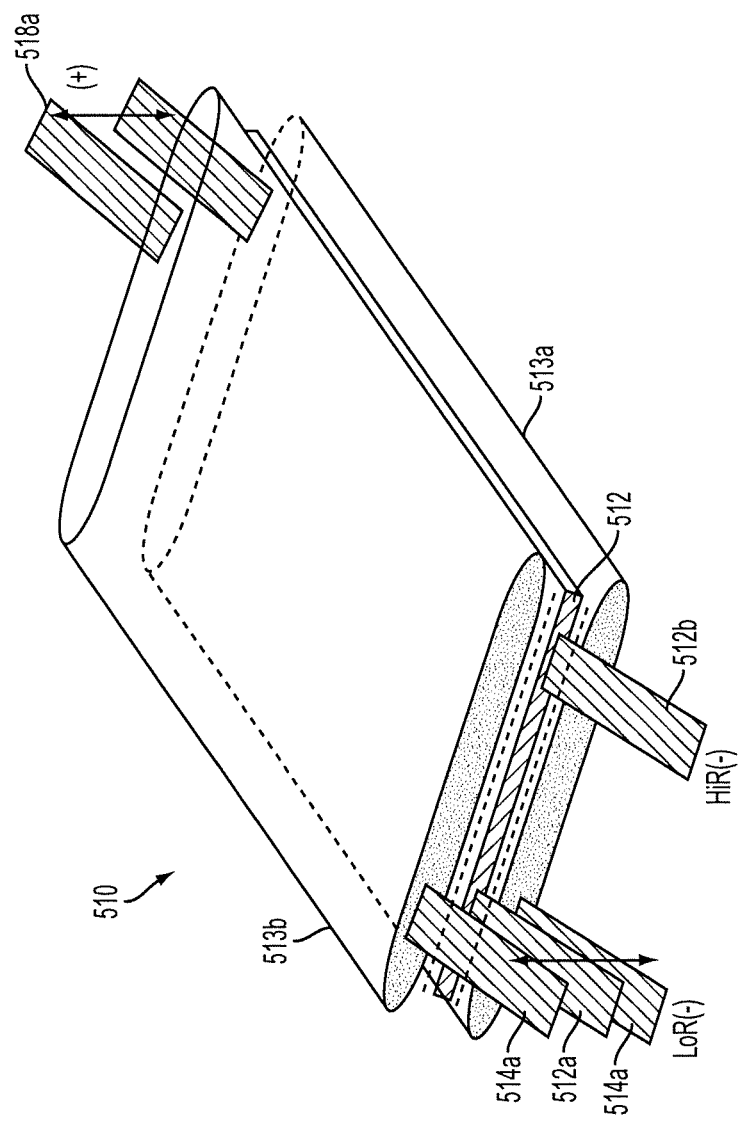
FIG. 5 illustrates a pair of jelly rolls sandwiching one resistor sheet/foil before inserting into a hard case or being packaged into a pouch cell, according to the embodiment of the present disclosure.

In another embodiment of the present disclosure, one or more resistor sheets can be sandwiched between two jelly rolls of electrode-separator assembly of a rechargeable battery. FIG. 5 illustrates such an embodiment. As shown in FIG. 5, resistor sheet 512 is sandwiched between two jelly rolls (513a, 513b). The design in this embodiment can be used with any conventional rechargeable battery containing jelly roll electrode assemblies. As further shown in FIG. 5, the electrically resistor sheet 512 has two tabs (512a, 512b), which can be attached by welding. Resistor tab 512a is electrically connected to anode tabs 514a of anode electrodes of the jelly roll (not shown for illustrative convenience) and to a low-resistance negative terminal LoR(−) (not shown) to form a low electrical resistance circuit. Resistor tab 512b is electrically connected to high-resistance negative terminal HiR(−) (not shown) to form a high electrical resistance level circuit. Cathode tabs 518a of cathode electrodes of the jelly roll are electrically connected together and to a positive terminal (not shown for illustrative convenience). The rechargeable battery in this embodiment would also include a switch outside of the battery that can electrically connect or disconnect the LoR(−) terminal and the HiR(−) terminal. The rechargeable battery 510 of FIG. 5 can be operated in the same manner as described for FIG. 1.

While the battery configuration in FIG. 5 is illustrated as two jelly rolls with one resistor sheet therebetween, rechargeable batteries of the present disclosure can have more than two jelly rolls and/or more than one resistor sheet positioned in the middle of the jelly roll. For example, the battery can have three or more jelly rolls with one or more resistor sheets positioned between a pair of jelly rolls and/or around other positions near each or some of the jelly rolls.

In one embodiment of the present disclosure, one or more of the resistor sheets shown in FIG. 3 can be used in the configurations of FIG. 5. For example, for any resistor sheet in FIG. 3, the tabs labeled as Tab 1 can be connected to the negative terminals of the cells, forming a low-resistance terminal for the battery, LoR(−). Tab 2 of any of the resistor sheets shown in FIG. 3 can be welded together to form the high resistance terminal of the battery, HiR(−). The activation and operation of such a battery is the same as described for the battery of FIG. 1.

In an embodiment of the present disclosure, a rechargeable battery can be constructed without using a separate resistor sheet to produce the high electrical internal resistance level of the battery. For example, a high electrical resistance circuit can be configured to be integrally part of the current collector of an electrode of the cell of the battery. In one embodiment of the present disclosure, a rechargeable battery includes at least one negative terminal and at least one positive terminal for operating the battery at $R_1$ over $T_1$ and $T_2$; at least one high resistance terminal (e.g., an additional negative or positive terminal) for operating the battery at $R_2$ outside of either $T_1$ or $T_2$; and a switch that activates $R_2$ when the temperature of the battery is outside of either $T_1$ or $T_2$, wherein the at least one high resistance terminal is electrically connected to at least one resistor sheet within a cell of the battery and wherein the at least one resistor sheet is integrally part of the current collector of an electrode of the cell of the battery.

Figure 6:
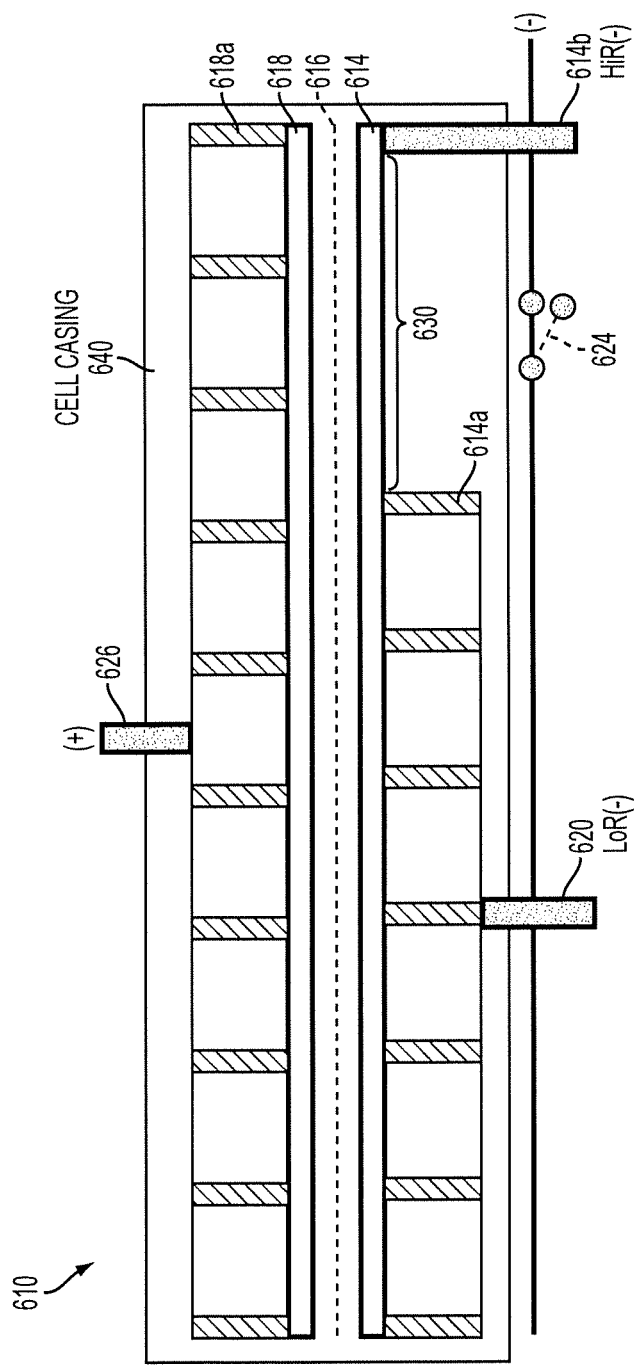
FIG. 6 is a schematic illustrating an unfolded jelly roll contained in a pouch cell wherein the positive electrode sheet has a number of closely spaced tabs welded together to form the positive terminal (+), and the negative electrode sheet has some closely spaced tabs welded together to form a low-resistance terminal LoR(−) as well as a far-away tab forming the high-resistance terminal HiR(−), according to the embodiment of the present disclosure. The LoR(−) terminal is connected with the HiR(−) terminal by a thermally activated switch.

FIG. 6 illustrates such an embodiment. FIG. 6 shows an assembly including anode electrode 614, separator 616 and cathode electrode 618. This assembly is applicable to a wide variety of rechargeable battery configurations, such as a jelly roll design in a cell casing. In this embodiment, cathode (positive) electrode 618 includes a number of closely spaced tabs 618a electrically connected (e.g., welded together) to form Terminal (+) 626. On the other hand, anode (negative) electrode 614 includes a few closely spaced tabs (614a) electrically connected together to form terminal LoR(−) 620 and tab 614b that is at a distance from the closest tab 614a. Tab 614b can be electrically connected to a high electrical resistance terminal. In this example, Tab 614b forms the high electrical resistance terminal HiR(−).

In this design, the portion of the negative electrode foil, i.e. Cu foil, between tab 614b (the far-away tab) and the closest of the closely spaced tab (tab 614a), acts as a large resistance to be operative when the battery temperature is below the normal range, i.e. below $T_1$. In other words, the material between tabs 614a and 614b (designated 630) acts as the resistor sheet for this battery design. On the outside of the cell casing, the terminals LoR(−) and HiR(−) can be electrically connected and disconnected via switch 624, e.g., a temperature-sensitive switch. Activation and operation of a battery with the configuration illustrated in FIG. 6 can be done in the same manner as described for the battery in FIG. 1.

The electrical resistance of 630 will depend on, among other things, the distance between tab 614b and the closest tab 614a, on the material used to form the current collector, e.g., the composition of the foil, and any material on the foil between the two tabs and the desired resistance level of the high resistance terminal. Electrodes of a rechargeable battery are typically formed by coating one or more electrochemically active materials, with or without a binder and/or conductive diluent, onto a current collector. Such materials can also affect the electrical resistance of 630.

Figure 7:
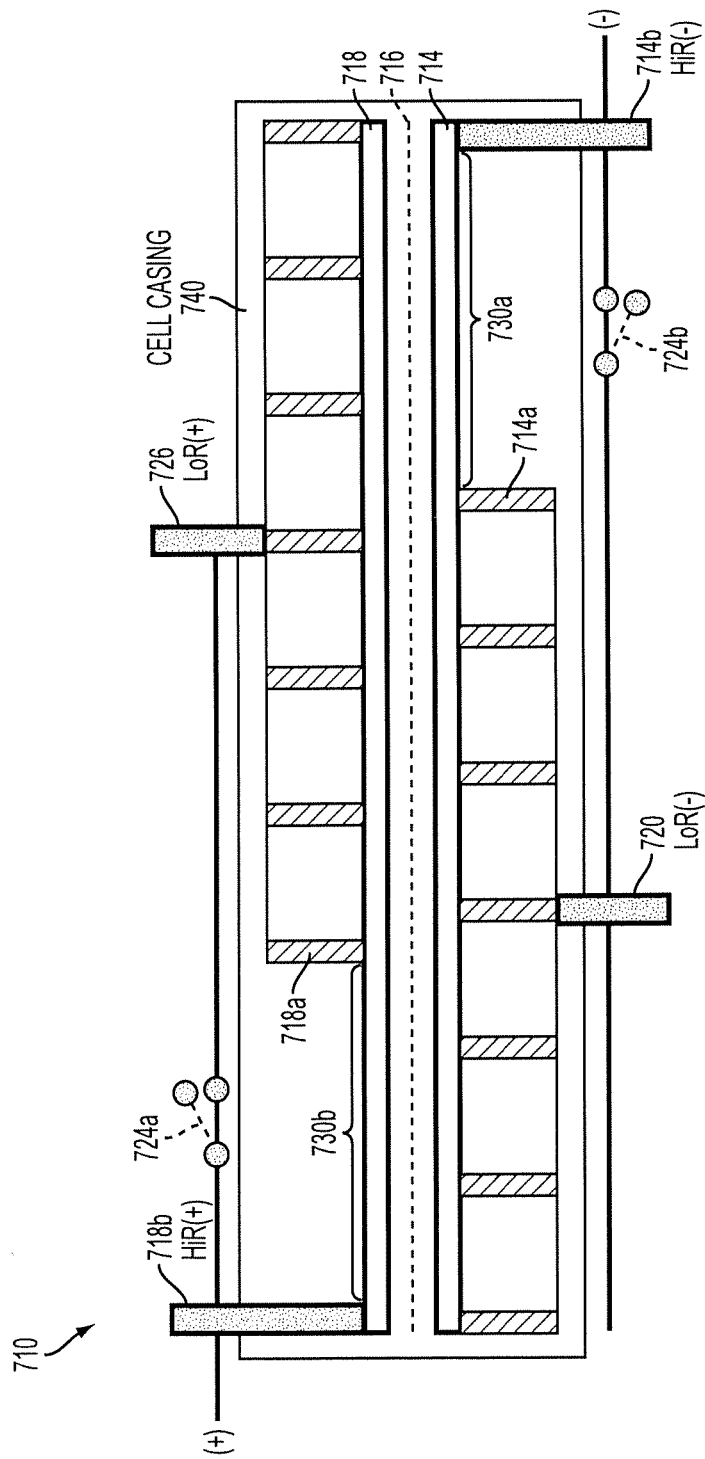
FIG. 7 illustrates a different design of an unfolded jelly roll with both the positive and negative electrode sheets featuring a number of closely spaced tabs and a far-away tab, respectively, according to the embodiment of the present disclosure. This design has four terminals outside the cell casing, i.e. two positive, LoR(+) and HiR(+), and two negative, LoR(−) and HiR(−). The two switches on both sides provide more than two levels of internal resistance according to the battery temperature and switching algorithms.

FIG. 7 illustrates another embodiment of a rechargeable battery of the present disclosure including a resistor sheet that is integrally part of the current collector of an electrode of the cell of the battery. In this embodiment, an assembly including anode electrode 714, separator 716 and cathode electrode 718 are shown. As noted for the configuration of FIG. 6, the assembly shown in FIG. 7 is applicable to a wide variety of rechargeable battery configurations. In this example, both cathode and anode electrodes have a number of closely spaced tabs electrically connected to form Terminals LoR(+) and LoR(−) as well as far-away tabs to form HiR(+) and HiR(−). In particular, cathode (positive) electrode 718 includes a number of closely spaced tabs 718a electrically connected to form Terminal (+) 726 and tab 718b that is at a distance from the closest tab 718a to form the high electrical resistance terminal HiR(+). Anode (negative) electrode 714 includes a few closely spaced tabs (714a) electrically connected together to form terminal LoR(−) 720 and tab 714b that is at a distance from the closest tab 714a to form the high electrical resistance terminal HiR(−)

In this design, the portions of the negative electrode foil (i.e. Cu) and positive electrode foil (i.e. Al) between the closely spaced tab group and far-away tab act as a large resistance to be operative when the battery temperature is below the normal range, i.e. below $T_1$. In other words, the material between tabs 714a and 714b (designated 730a) and the material between tabs 718a and 718b (designated 730b) act as resistor sheets for this battery design.

On the outside of cell casing 740, two independent switches (724a, 724b) can be used to connect the terminal LoR(+) with HiR(+) and LoR(−) with HiR(−), respectively. The two switches can operate simultaneously, or independently from each other, or according to an algorithm as a function of battery temperature. Otherwise, activation and operation of a battery with the configuration illustrated in FIG. 7 can be done in the same manner as described for the battery in FIG. 1

Many more tab designs for the jelly roll configuration of a rechargeable battery are possible as long as one group of tabs provides a low resistance and the other group of tabs provides a high resistance.

Figure 8:
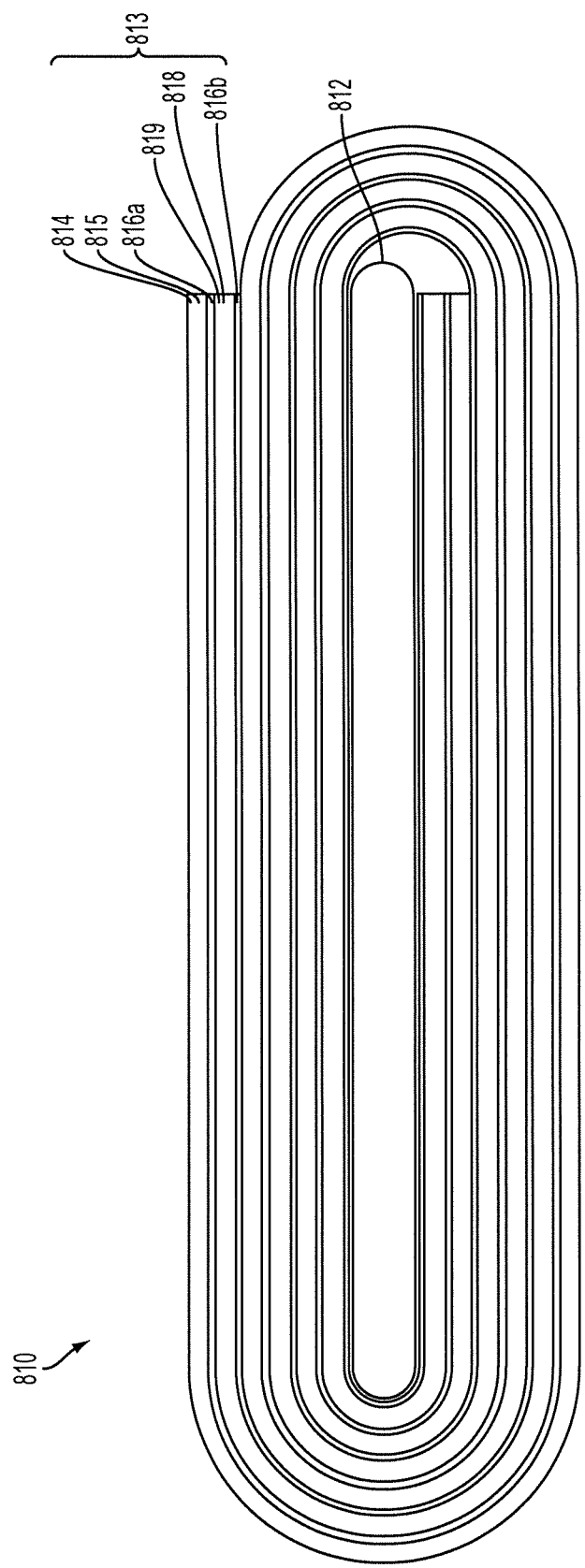
FIGS. 8, 9 and 10 illustrate flat jelly roll electrode assemblies having one or more resistor sheets according to the embodiment of the present disclosure.
Figure 9:
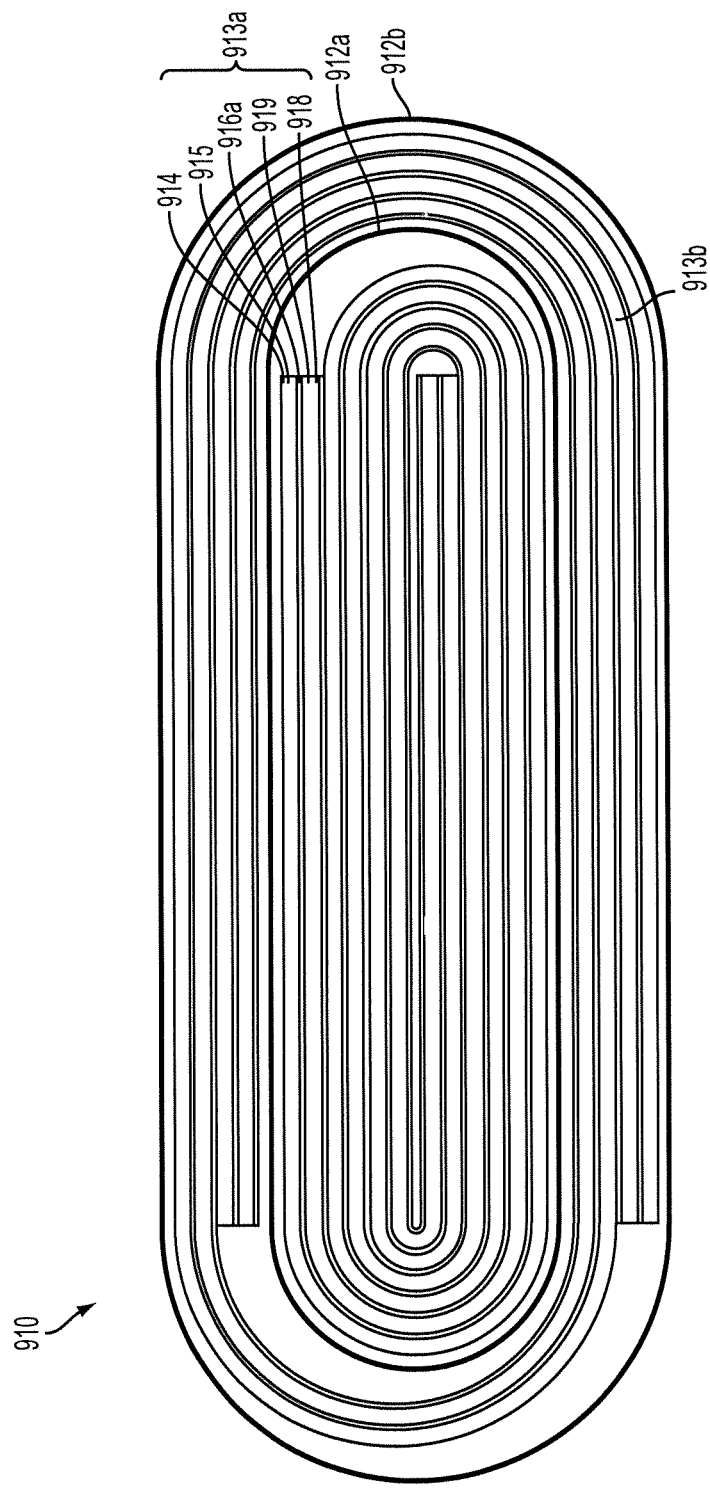
Figure 10:
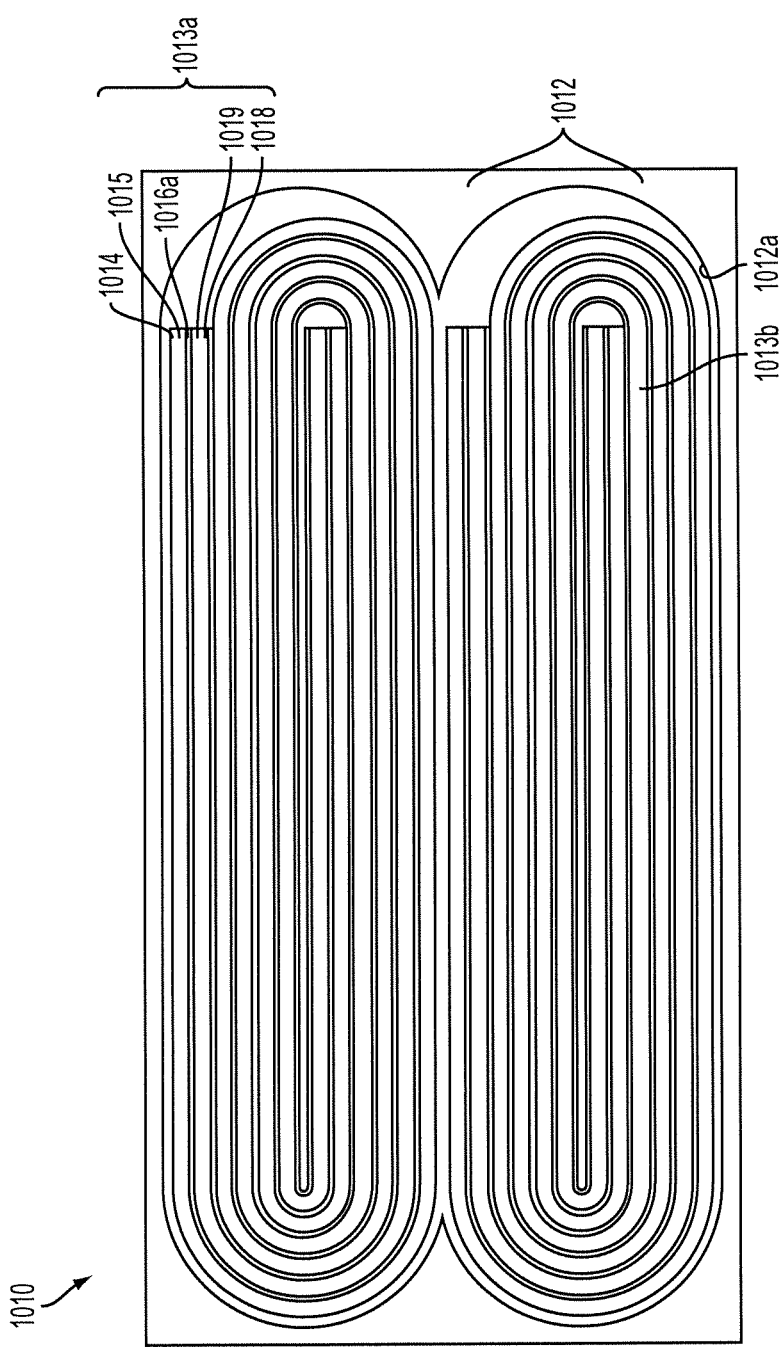

In another embodiment of the present disclosure, one or more resistor sheets can be included with a rolled electrode assembly of a rechargeable battery. FIGS. 8, 9 and 10 illustrate embodiments of a jelly rolled electrode assembly having one or more resistor sheets. As shown in FIG. 8, resistor sheet 812 is included within about the center of the jelly roll assembly. In this embodiment, the resistor does not directly contact any electrode and should not adversely affect the capacity of the cell. The resistor sheet can be inserted after the jelly roll is assembled or while assembling the jelly roll. The resistor sheet can also advantageously act as a structural support for the jelly roll assembly. The design in this embodiment can be used with any conventional rechargeable battery containing jelly roll electrode assemblies. As further shown in FIG. 8, the jelly roll assembly 813 further includes anode electrode 814 on current collector 815, e.g., a copper foil, first separator 816a, cathode electrode 818 on current collector 819, e.g. an aluminum foil, and second separator 816b. In addition to having a resistor sheet in more or less the center of the jelly roll assembly, a resistor sheet can be included on the outermost layer of the jelly roll. The jelly roll can be flat in shape, as shown in FIG. 8, or cylindrical.

FIG. 9 illustrates another embodiment of a jelly roll electrode assembly having a resistor sheet. In this embodiment, a series of resistor sheets are wrapped around a series of jelly roll assemblies. As shown in FIG. 9, resistor sheets 912a and 912b are wrapped around jelly roll assemblies 913a and 913b. FIG. 9 shows two jelly roll assemblies each having a resistor sheet on the outer circumference thereof. This configuration can be extended to additional jelly roll assemblies some or all of which have a resistor sheet on the outer circumference thereof to form a jelly roll assembly having a series of resistor sheets wrapped around a series of jelly roll assemblies. Such an assembly can be fabricated by winding a jelly roll assembly and then wrapping the resistor sheet on the outer circumference thereof followed by winding additional jelly roll assemblies with or without resistor sheets thereon.

Each of the jelly roll assemblies includes an anode electrode, cathode electrode, and separator. For example jelly roll assemblies 913a and 913b include anode electrode 914 on current collector 915, e.g., a copper foil, first separator 916a, cathode electrode 918 on current collector 919, e.g. an aluminum foil. A second separator can be included after current collector 919, which is not shown in the figure. In addition to having resistor sheets wrapped around the outermost layer of the jelly roll, a resistor sheet can be included in more or less the center of the inner most jelly roll assembly.

FIG. 10 illustrates another embodiment of a jelly roll electrode assembly having a resistor sheet. In this embodiment, the container holding the jelly roll assembly or assemblies can act as the resistor sheet even though it is not in the shape of a sheet. As shown in FIG. 10, resistor sheet 1012 surrounds two jelly roll assemblies 1013a and 1013b. Resistor sheet 1012 has an inner surface 1012a contact a substantial portion of the outermost layer of the jelly roll assemblies. The resistor sheet can be a container holding the assemblies, e.g., a steel can. In this embodiment, resistor sheet 1012 is shaped to have two compartments to hold the two jelly roll assemblies but this embodiment is not limited to such a shape so long as an inner surface of resistor sheet 1012 contacts a substantial portion of at least one of the jelly roll assemblies, the resistor sheet can function as described in the present disclosure. In addition, the configuration of FIG. 10 can be extended to additional jelly roll assemblies some or all of which are positioned in one or more compartments or contact the resistor sheet.

Each of the jelly roll assemblies includes an anode electrode, first separator, cathode electrode, and second separator. For example jelly roll assemblies 1013a and 1013b include anode electrode 1014 on current collector 1015, e.g., a copper foil, first separator 1016a, cathode electrode 1018 on current collector 1019, e.g. an aluminum foil. A second separator can be included after current collector 919, which is not shown in the figure. In addition to resistor sheet 1012, a resistor sheet can be included in more or less the center of one or all of the jelly roll assemblies in this embodiment.

While the battery configurations in FIGS. 8, 9, and 10 are illustrated as jelly rolls that having an asymmetrical shape, the jelly rolls and resistor sheets can be symmetrical, such as cylindrical jelly roll assemblies with corresponding cylindrical resistor sheets.

In addition to the elements illustrated in FIGS. 8, 9, 10, additional elements are included to form working batteries with the configurations of FIGS. 8, 9 and 10, which were not shown for illustrative convenience. These elements include, for example, a high resistance terminal electrically connected to the resistor sheet as part of a high electrical resistance level circuit; a low resistance terminal which is electrically connected to the resistor sheet and to one of the electrodes, e.g., the anode or cathode electrodes, to form a low electrical resistance circuit; a switch that can electrically connect or disconnect the low resistance and high resistance terminals. The rechargeable battery 810, 910 and 1010 of FIGS. 8, 9 and 10, respectively, can be operated in the same manner as described for FIG. 1, for example.

In another embodiment of the present disclosure, one or more of the resistor sheets shown in FIG. 3 can be used in the configurations of FIGS. 8, 9 and 10. For example, for any resistor sheet in FIG. 3, the tabs labeled as Tab 1 can be connected to the negative terminals of the cells, forming a low-resistance terminal for the battery, LoR(−). Tab 2 of any of the resistor sheets shown in FIG. 3 can be welded together to form the high resistance terminal of the battery, HiR(−). The activation and operation of such a battery is the same as described for the battery of FIG. 1.

All afore-described battery designs are applicable to rechargeable batteries such as Li-ion, nickel-metal hydride, lead-acid, etc. Advantageously, the rechargeable battery of the present disclosure can be implemented for all battery chemistries, such as rechargeable lithium ion, nickel-metal hydride, or advanced lithium batteries such as lithium-sulfur, lithium-polymer, lithium-air batteries or all solid-state batteries, and for all form factors, either pouch, cylindrical, prismatic or angular. The cell designs described above for FIGS. 1-10 can be used to fabricate an all climate battery with a low internal resistance ($R_1$) for one set of terminals and a high internal resistance ($R_2$) for a second set of terminals. The cell structure can accommodate rolled electrode and stacked electrode designs, among other designs.

In one aspect of the present disclosure, a rechargeable battery is operated $R_1$ when the temperature of the battery is between $T_1$ and $T_2$, and at $R_2$ outside of either $T_1$ or $T_2$ by activating a switch that activates $R_2$ when the temperature of the battery is outside of either $T_1$ or $T_2$. Operating the battery at a high resistance level ($R_2$) can include applying a constant voltage-constant current (CVCC) cycle to increase the internal temperature of the battery. Such an activation cycle can generate a large amount of internal heat by operating the battery in the high-resistance mode and under a low cell voltage. The activation cycle can include operating the battery under constant voltage followed by constant current limit. In certain embodiments, the constant voltage is set in a range from 0.2 to 1V and the current limit is set in a range from 1 C to 10 C (C-rate defined here is a ratio of the current in Amps to the battery nominal capacity; say for a 10 Ah battery, 1 C means 10 A). Preferably the constant voltage ranges from 0.4V to 1.0V and the current limit is 2 C to 5 C, e.g. 4 C.

EXAMPLE

The following example is intended to further illustrate certain preferred embodiments of the invention and is not limiting in nature. Those skilled in the art will recognize, or be able to ascertain, using no more than routine experimentation, numerous equivalents to the specific substances and procedures described herein.

A pilot-production battery of 26 Ah, in the form of a pouch cell and made of lithium-nickel-manganese-cobalt (NMC) cathode and graphite anode, was developed according to the construction described in FIG. 1. The resistor sheet is a stainless steel foil of 25 cm long, 6 cm wide and 100 um thick. Its resistance is approximately 0.05 Ohm and its weight is ~13 grams which is about 2.3% of the total battery weight. The switch between the LoR(−) and HiR(−) terminals is done by an electromechanical relay driven by a temperature controller. The relay is set to switch at about 0° C. The relay weighs about 7 grams. Prior to testing, the test battery is fully charged and then soaked for 5-6 hours in a thermal chamber that is preset at a subfreezing temperature. During testing of the 26 Ah all climate battery, several thermocouples are mounted onto the battery and connected to voltmeters to read the average battery temperature which drives the relay. A baseline cell without the resistor foil and the temperature-sensitive switch but remaining otherwise identical was also tested for a comparative study.

Figure 11A:
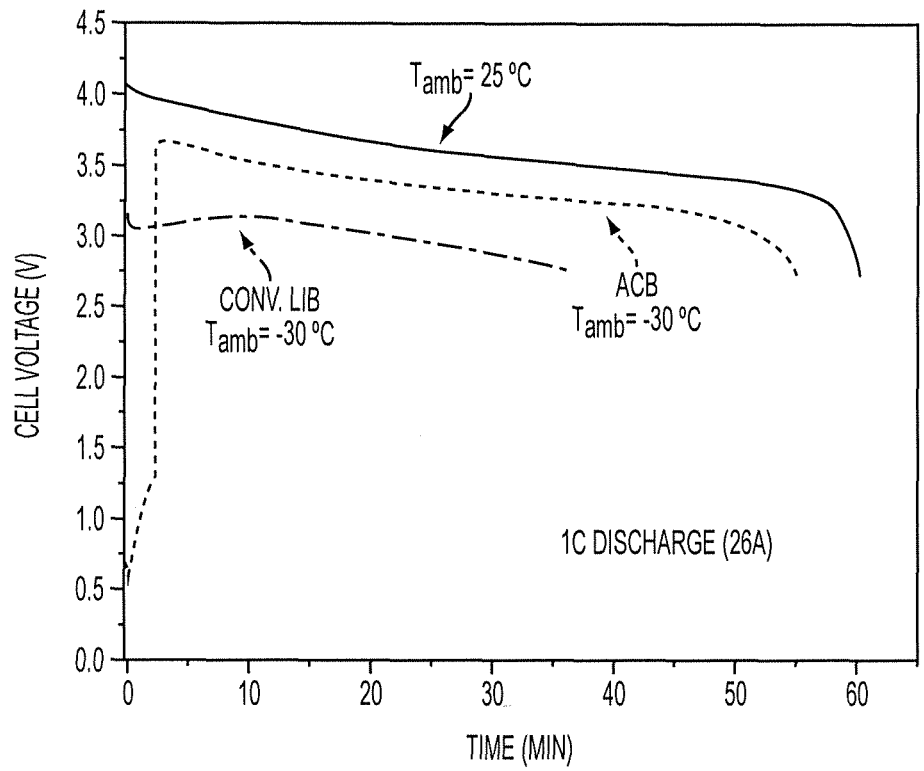
FIGS. 11A-11B show a series of graphs to illustrate the 1 C discharge behavior from −30° C. of a 26 Ah all climate battery (ACB) according to an embodiment of the present disclosure.
Figure 11B:
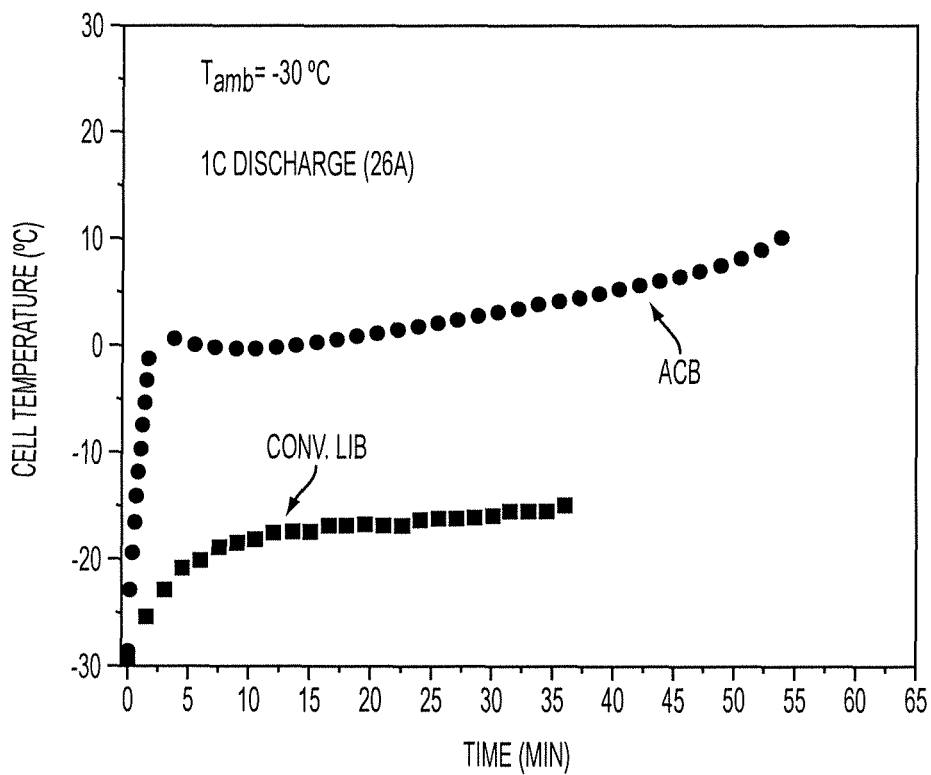
Figure 12A:
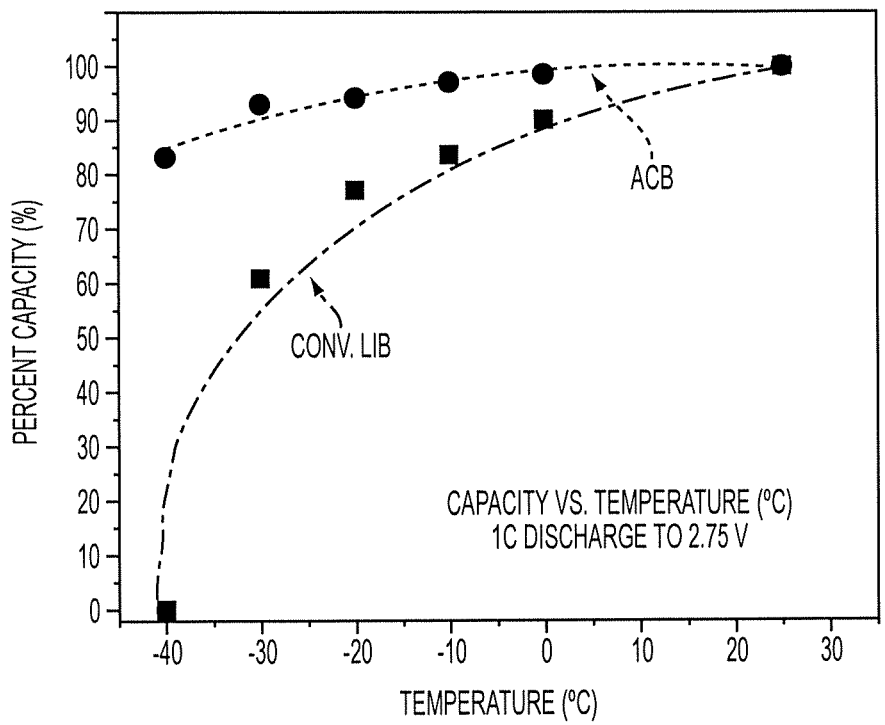
FIGS. 12A and 12B show the battery capacity and energy as function of the ambient temperature for both ACB and conventional LiB, respectively.
Figure 12B:
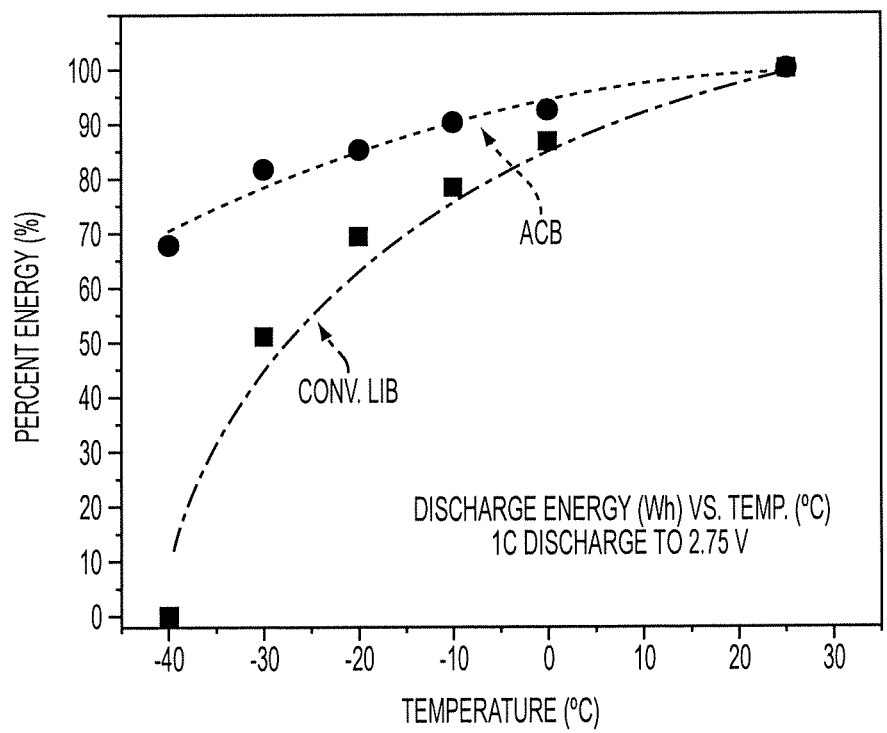

Test results of the all climate battery (labeled as ACB in FIG. 11) and the baseline battery (labeled as cony. LiB in FIG. 11) for 1 C discharge from −30° C. are shown in FIG. 11A. In the case of ACB, the battery testing begins with a brief activation period where a constant current equivalent to 2 C (i.e. 52 A) was applied onto the high-resistance terminals for about 142 seconds. The cell voltage is seen to lie between 0.6 to 1.3V from FIG. 11A. In this activation period, the resistor sheet embedded inside the cell heats up rapidly, which quickly warms up the cell as indicated by the average battery temperature displayed in FIG. 11B. When the battery temperature reaches about 0° C., a set point at which the battery switches to the low internal resistance, the activation is completed and the battery undergoes a standard 1 C (i.e. 26 A) discharge as shown in FIG. 11A. The discharge curve of the ACB is contrasted to that of the conventional LiB, showing substantially improved voltage, capacity and energy output in the case of ACB. Similar 1 C discharge experiments of ACB and conventional LiB from various ambient temperatures were carried out. The capacity and discharge energy are shown in FIGS. 12A and 12B, respectively. It is seen that the ACB delivers >90% of room-temperature capacity and >82% of room-temperature energy in the −30° C. environment. In comparison, the conventional LiB outputs only 60% and 50% of room-temperature capacity and energy at −30° C. The improvement of ACB performance at −40° C. is even more substantial, retaining 85% and 70% of room-temperature capacity and energy, whereas the conventional LiB has almost zero capacity and energy output under the same ambient condition. 2 C discharge experiments have been also carried out, and power and energy output is equally impressive.

Figure 13A:
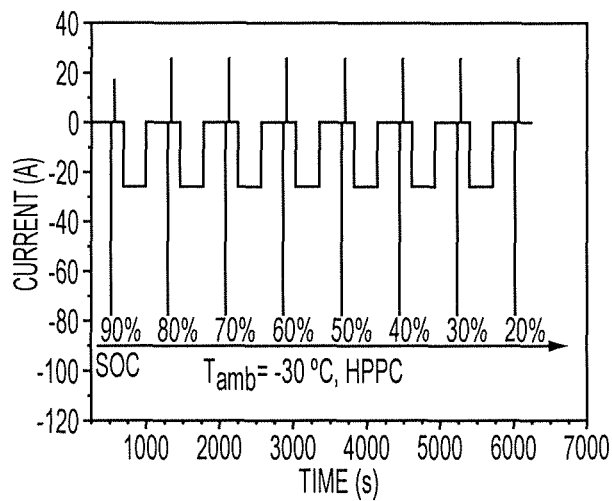
FIGS. 13A-13C are a series of graphs showing the power performance of an ACB at −30° C. under hybrid power pulse characterization (HPPC) test.
Figure 13B:
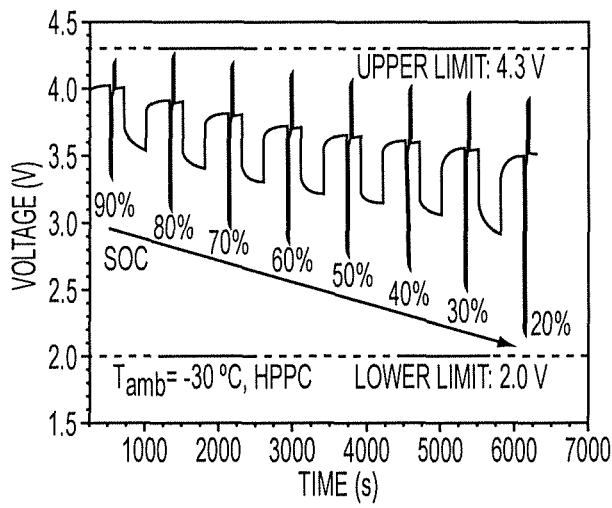
Figure 13C:
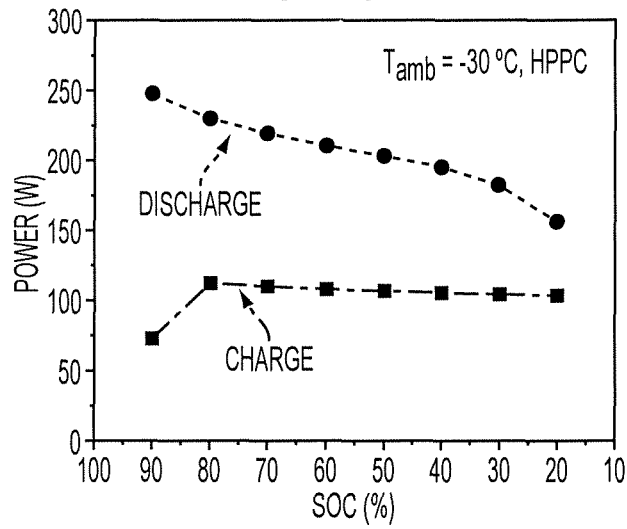

A hybrid power pulse characterization (HPPC) test was also run to quantify the power capability of the 26 Ah ACB. The HPPC test starts from a given state of charge (SOC) and proceeds with a 3 C discharge pulse for 20 seconds, then 20 seconds rest, followed by a 1 C charge pulse for 20 seconds. The voltage response to such a HPPC load is shown in FIG. 13B. Discharge and charge power, calculated by multiplying the discharge/charge current with the cell voltage at the end of each 20-second pulse, are shown in FIG. 13C. This discharge and charge power at −30° C. is about 6-7 times of that by a conventional LiB.

While the aforementioned test results are shown for a regular Li-ion battery, all climate batteries based on advanced Li-ion batteries, nickel-metal hydride (Ni-MH), lead-acid (Pb-acid) and other battery chemistries is expected to have the same advantages.

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. A rechargeable battery comprising:
   at least one negative terminal and at least one positive terminal forming an internal resistance ($R_1$) over a temperature range of the battery between a first temperature ($T_1$) and a second temperature ($T_2$);
   at least one high resistance terminal electrically connected to at least one resistor sheet within or adjacent a cell of the battery forming a second internal resistance ($R_2$) wherein $R_2$ is higher than $R_1$; and
   a switch configured to electrically connect or disconnect the at least one high resistance terminal with either the at least one positive terminal or the at least one negative terminal.

2. The rechargeable battery according to claim 1, wherein the at least one resistor sheet is within a cell of the battery.

3. The rechargeable battery according to claim 1, wherein the at least one high resistance terminal is an additional positive terminal.

4. The rechargeable battery according to claim 1, wherein the at least one resistor sheet comprises nickel, copper, aluminum, or combinations thereof.

5. The rechargeable battery according to claim 4, wherein the at least one resistor sheet is positioned within a cell of the battery.

6. The rechargeable battery according to claim 1, wherein the at least one resistor sheet is made of graphite, highly ordered pyrolytic graphite (HOPG), stainless steel, nickel, chrome, nichrome, copper, aluminum, titanium, or combinations thereof.

7. The rechargeable battery according to claim 1, wherein the at least one resistor sheet has a thickness of 1-150 micrometers.

8. The rechargeable battery according to claim 1, wherein the at least one resistor sheet is sandwiched inside an electrode-separator stack or sandwiched inside or between jelly roll electrode assemblies.

9. The rechargeable battery according to claim 1, wherein the at least one resistor sheet is configured to have two tabs, with one tab electrically connected to other electrode tabs in the battery, and the other tab of the at least one resistor sheet electrically connected to the at least one high-resistance terminal.

10. The rechargeable battery according to claim 1, comprising several resistor sheets embedded within a stack of electrode separator assemblies wherein each resistor sheet has two tabs, with one tab electrically connected to other electrode tabs in the battery, and the other tab of the resistor sheet electrically connected to the at least one high-resistance terminal.

11. The rechargeable battery according to claim 1, wherein the at least one resistor sheet has a resistance in units of Ohm equal to the numerical value of between 0.1 to 5 divided by the battery's capacity in Amp-hours (Ah).

12. The rechargeable battery according to claim 1, wherein the at least one high resistance terminal is an additional negative terminal.

13. The rechargeable battery according to claim 1, wherein the switch is a thermally activated switch configured to electrically connect or disconnect the at least one high resistance terminal with either the at least one positive terminal or the at least one negative terminal when a temperature of the battery is below $T_1$.

14. The rechargeable battery according to claim 1, wherein the battery is a nickel-metal hydride battery.

15. The rechargeable battery according to claim 1, wherein the battery is a lithium ion battery.

16. A battery system comprising the rechargeable battery according to claim 1 and a controller configured to operate the switch to change the internal resistance to $R_2$ when a temperature of the battery is below $T_1$.

17. A rechargeable battery comprising:
   an anode electrically connected to a negative terminal;
   a cathode electrically connected to a positive terminal;
   a high resistance terminal electrically connected to at least one resistor sheet which is electrically connected to either the negative terminal or the positive terminal; and
   a switch configured to electrically connect or disconnect the high resistance terminal to either the negative terminal or the positive terminal.

18. The rechargeable battery according to claim 17, wherein the at least one resistor sheet is adjacent a cell of the battery.

19. The rechargeable battery according to claim 17, wherein the at least one high resistance terminal is an additional negative terminal.

20. The rechargeable battery according to claim 17, wherein the at least one high resistance terminal is an additional positive terminal.

21. The rechargeable battery according to claim 17, wherein the at least one resistor sheet is made of graphite, highly ordered pyrolytic graphite (HOPG), stainless steel, nickel, chrome, nichrome, copper, aluminum, titanium, or combinations thereof.

22. The rechargeable battery according to claim 17, wherein the at least one resistor sheet has a resistance in units of Ohm equal to the numerical value of between 0.1 to 5 divided by the battery's capacity in Amp-hours (Ah).

23. A rechargeable battery comprising:
   an anode electrically connected to a negative terminal;
   a cathode electrically connected to a positive terminal;
   a high resistance terminal electrically connected to at least one resistor sheet which is electrically connected to either the negative terminal or the positive terminal, wherein the at least one resistor sheet is within a cell of the battery; and
   a switch configured to electrically connect or disconnect the high resistance terminal to either the negative terminal or the positive terminal.

24. The rechargeable battery according to claim 23, wherein the at least one resistor sheet comprises nickel, copper, aluminum, or combinations thereof.

25. The rechargeable battery according to claim 23, wherein the at least one resistor sheet has a resistance in units of Ohm equal to the numerical value of between 0.1 to 5 divided by the battery's capacity in Amp-hours (Ah).

* * * * *